United States Patent
Graham et al.

(10) Patent No.: US 6,661,930 B1
(45) Date of Patent: Dec. 9, 2003

(54) METHOD FOR NESTING A COMPUTER MODEL OF A PART WITH A COMPUTER MODEL OF A FIXTURE

(75) Inventors: Michael Evans Graham, Slingerlands, NY (US); Dean Michael Robinson, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 649 days.

(21) Appl. No.: 09/583,938

(22) Filed: May 31, 2000

Related U.S. Application Data (63) Continuation-in-part of application No. 09/559,305, filed on Apr. 25, 2000.

(51) Int. Cl.[7] .................................................. G06K 9/36
(52) U.S. Cl. ....................... 382/276; 382/155; 382/173; 703/1; 700/182; 700/193
(58) Field of Search .................................. 382/151, 276, 382/173, 155; 703/1–3, 6; 700/3, 182, 157, 118, 119, 164; 269/281; 324/601; 345/419, 420; 702/95, 192, 194

(56) References Cited

U.S. PATENT DOCUMENTS

| | | |
|---|---|---|
| 3,633,011 A | 1/1972 | Bedermann et al. |
| 5,295,200 A | 3/1994 | Boyer |
| 5,546,328 A | 8/1996 | Kiridena et al. |
| 5,715,167 A | 2/1998 | Gupta et al. |
| 6,094,793 A * | 8/2000 | Szuba ........................... 408/13 |
| 6,104,403 A * | 8/2000 | Mukouchi et al. ........... 345/419 |
| 6,507,806 B1 * | 1/2003 | Tandler ......................... 703/1 |

* cited by examiner

Primary Examiner—Jayanti K. Patel
Assistant Examiner—Sheela Chawan
(74) Attorney, Agent, or Firm—David C. Goldman, Esq.; Beusse, Brownlee, Bowdoin & Wolter, P.A.; Enrique J. Mora, Esq.

(57) ABSTRACT

A method of nesting a computer model of a part (100) into a computer model of a fixture (104) useful for situations where the original positions of the part and fixture are completely separate and for situations where the respective part and fixture surfaces overlap. The model of the fixture is first inset by a distance D sufficient to eliminate any overlap between the modeled surfaces. The minimum normal distance segment (105) between the inset fixture surface and the part surface may then be determined using standard CAD system capabilities. A vector is then constructed having a length D beginning at the minimum distance point 111 on the inset fixture surface (107) and extending in the direction of the minimum normal distance segment (105) to a point (112) on the original fixture model surface (106). The minimum distance segment between point (112) and the surface of the part (102) is then determined to identify a point (114). The respective point pair (112,114) is recorded. Similar point pairs are recorded for each degree of freedom of movement between the part and the fixture. An orthonormal transformation matrix is then identified for moving the part to a position that minimizes the aggregate distance between the respective point pairs. This process may be repeated until the aggregate distance satisfies an acceptance criteria, whereupon the part model is deemed to be nested into the fixture model.

10 Claims, 9 Drawing Sheets

METHOD FOR NESTING A COMPUTER MODEL OF A PART WITH A COMPUTER MODEL OF A FIXTURE

This application is a continuation-in-part of U.S. patent application Ser. No. 09/559,305 filed on Apr. 25, 2000.

BACKGROUND OF THE INVENTION

This invention relates generally to the field of manufacturing, and more particularly, to the use of digital models of parts and fixtures, and specifically to a method for analytically modeling the nesting of a part into a fixture for performing a manufacturing procedure.

Machine tools are capable of very precise movements relative to the working surface of the tool. Typical manufacturing operations performed in this manner may include drilling, turning, milling, routing, welding, etc. The accuracy of such a manufacturing operation is limited not by the ability of the machine tool to perform a desired movement, but rather, by the ability of the operator to position the part accurately within the coordinate system of the machine tool. Highly skilled operators using precision measuring instruments are capable of performing machine/part setups for very precise operations. However, the cost of such precision setups is prohibitive for most applications involving high volume operations.

It is known to utilize fixtures to secure a part relative to the working surface of a machine tool during a manufacturing operation. The precision fixture is a mass production solution to the cost of precision setup. Rather than having a skilled machinist precisely position each part to be machined, the use of a precision fixture allows a machinist of lesser ability to rapidly and precisely place a part in a machine tool. In its simplest application, a skilled machinist would set up the machine and fixture, and a less skilled individual would then load the parts and operate the tool to perform the manufacturing operation. Conventional wisdom is that precise parts require very precise fixtures and that fixtures must be made to tolerances that are significantly smaller than their respective part tolerances. Standard practice for inspection or measurement operations is that the gauge tolerance should be only ten percent of the part tolerance. To a large extent, this standard is also applied to fixtures. There are four problem areas commonly associated with precision fixtures. These problems are cost, availability, accuracy, and error documentation. Furthermore, these problems tend to be closely interrelated. The most basic of these problems is cost. In addition to the initial cost of manufacture, there are costs of validation, maintenance, and rework. Contact points on fixtures are subject to wear, and fixture shapes must be verified periodically, with occasional rework being necessary to return them to their specified dimensions. There is also the cost of setting up an incorrectly shaped fixture or adjusting the setup to compensate for part-to-part or lot-to-lot differences.

Availability is related to cost, since all too often, extra fixtures are held in inventory in case they are needed. The manufacture of a precision fixture can be a very time-consuming operation, and in most applications, the demands of production require that one or more spare fixtures be available at all times. In the aggregate, the cost of this inventory may be significant.

The problem of accuracy can be exacerbated in some applications, for example laser drilling. A small deviation in the shape of a fixture may translate into a very large error in the location of a machined feature. In a laser drilling application, for example, the holes in the surface of a part may be formed at a large angle relative to the surface normal at the drilling point. At angles such as 70 or 80 degrees from normal, even a small error in the location of the surface will result in a large error in the location of the hole.

The documentation problem is generated by the common practice of making manual adjustments to numerically controlled (NC) tool paths or the use of mechanical shims to adjust the location of a part within a fixture. Such practices may remain undocumented, and when the process is moved to a new location or discontinued for a period of time, such undocumented adjustments may be lost, resulting in cost and quality problems when the process is later reinitiated. In cases where fixtures are shimmed or NC programs are altered, the true as-manufactured product definition may be impossible to establish.

Analytical and measuring techniques have been developed to avoid or to minimize such problems. These techniques often involve the modeling of a part and/or a fixture with a Computer Aided Design (CAD) tool, but they usually require manual trial-and-error methods to determine the correct relative positions of the part and fixture models. What is needed is a robust and automatic method for determining the correct position of a part model relative to a fixture model, especially in cases where the part and/or fixture models deviate from their nominal shapes.

With actual hardware, a part may be said to be "nested" into a fixture when there are only tangential surface-to-surface contacts between the part and the fixture, and when there is no way to rotate or to translate the part without causing loss of contact at one of the contact points. Similarly, the analytical nesting of parts involves positioning a part model into a fixture model so that these same two conditions are satisfied: first, there is only tangential surface-to-surface contact between the two models; and second, there is no way to move the model without causing either a loss of contact at one of the contact points or a non-allowable intersection (overlap) between the two models. In rare cases, it may be possible to obtain a non-unique nesting position, in which only the first condition (tangential contact) is satisfied, and it is possible to move the part through some range of motion while maintaining tangential contact. For example, consider a sphere resting on three point supports. In general, fixtures are designed so that corresponding parts have a unique nesting position. In cases where there are non-unique nesting positions, the method described here will find one of the possible nesting positions.

While the nesting of actual parts into actual fixtures is a relatively simple operation for a human being, the nesting of computer models of parts into computer models of fixtures and the recording of the resulting transformation matrix is not a simple task. For example, when the two models start from an overlapped position, existing computer tools define two interfering surfaces as having a zero distance between them, without providing any information regarding the depth of penetration of the interference. This makes it very difficult to determine how to move the part model to achieve the proper tangential contact.

BRIEF SUMMARY OF THE INVENTION

Thus, there is a particular need to develop a method for nesting computer models of parts into computer models of fixtures and for recording the transformation matrix describing the part/fixture movement during the nesting operation. The is a further need to develop a method for nesting a computer model of a part into a computer model of a fixture starting from a position where the part and the fixture surfaces overlap.

Accordingly, A method of nesting a computer model of a part into a computer model of a fixture, the method comprising the steps of generating a model of a part in a computer tool, the part having a part model surface; generating a model of a fixture in the computer tool, the fixture model having a fixture model surface; generating a model of an inset fixture in the computer tool, the inset fixture having an inset fixture model surface that is inset from the fixture model surface by a distance D sufficient to eliminate any interference between the inset fixture model surface and the part model surface; identifying a first minimum normal distance segment between the inset fixture model surface and the part model surface, the first minimum normal distance segment having as endpoints a part surface minimum distance point and an inset fixture surface minimum distance point; constructing a vector extending a distance D in the direction of the first minimum normal distance segment beginning at the inset fixture surface minimum distance point and extending to a fixture contact point on the fixture model surface; identifying a part contact point on the part model surface corresponding to the fixture contact point, the part contact point being a minimum normal distance from the fixture contact point; recording the part contact point as $(X_1,Y_1,Z_1)$ and the fixture contact point as $(x_1,y_1,z_1)$; transforming points of the part model to corresponding points of a transformed part model by applying a transformation matrix that minimizes the distance between the fixture contact point and a transformed part contact point; recording the transformation matrix.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

The preferred fixtures for this method have contact surfaces which are flat, spherical, cylindrical, or, face intersections (edges). These fixture contact shapes are preferred because it is possible to measure them with a high degree of precision and they are simple to model numerically. This method may also be used with fixtures whose contact faces are not simple shapes, although some loss of precision may be expected due to the difficulties in modeling these surfaces from actual measurement data.

Figure 1:
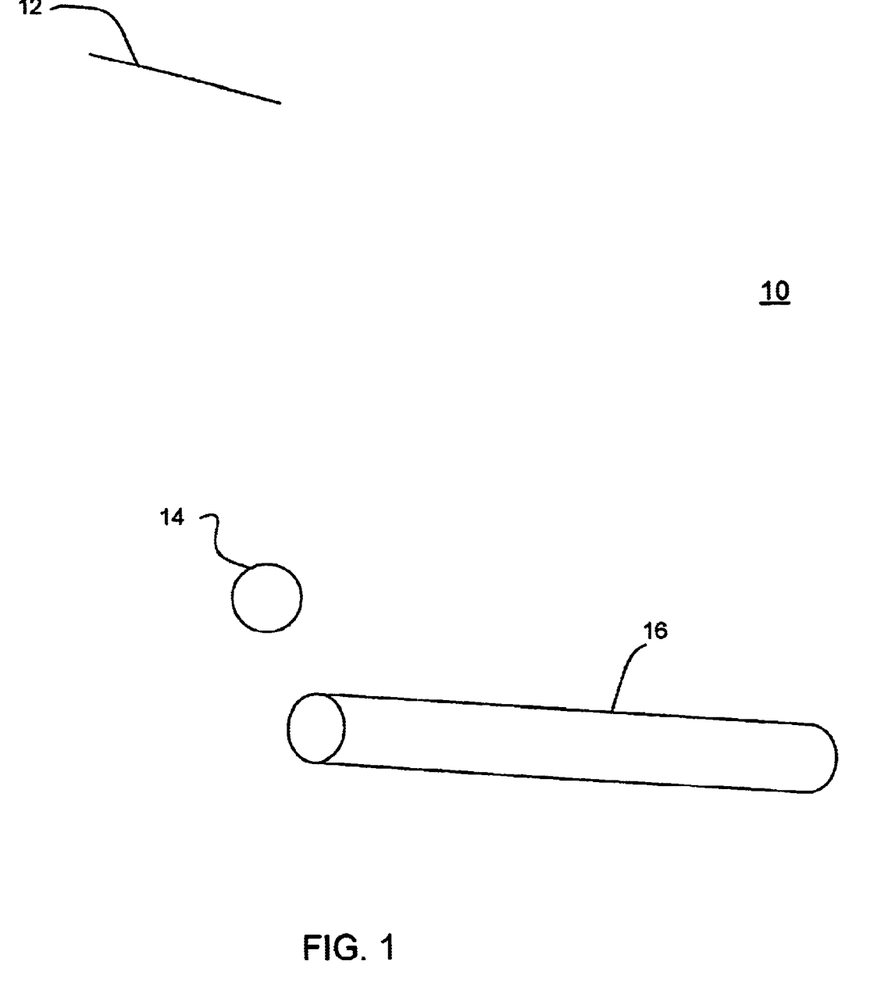
FIG. 1 illustrates the contact surfaces of a fixture.
Figure 2:
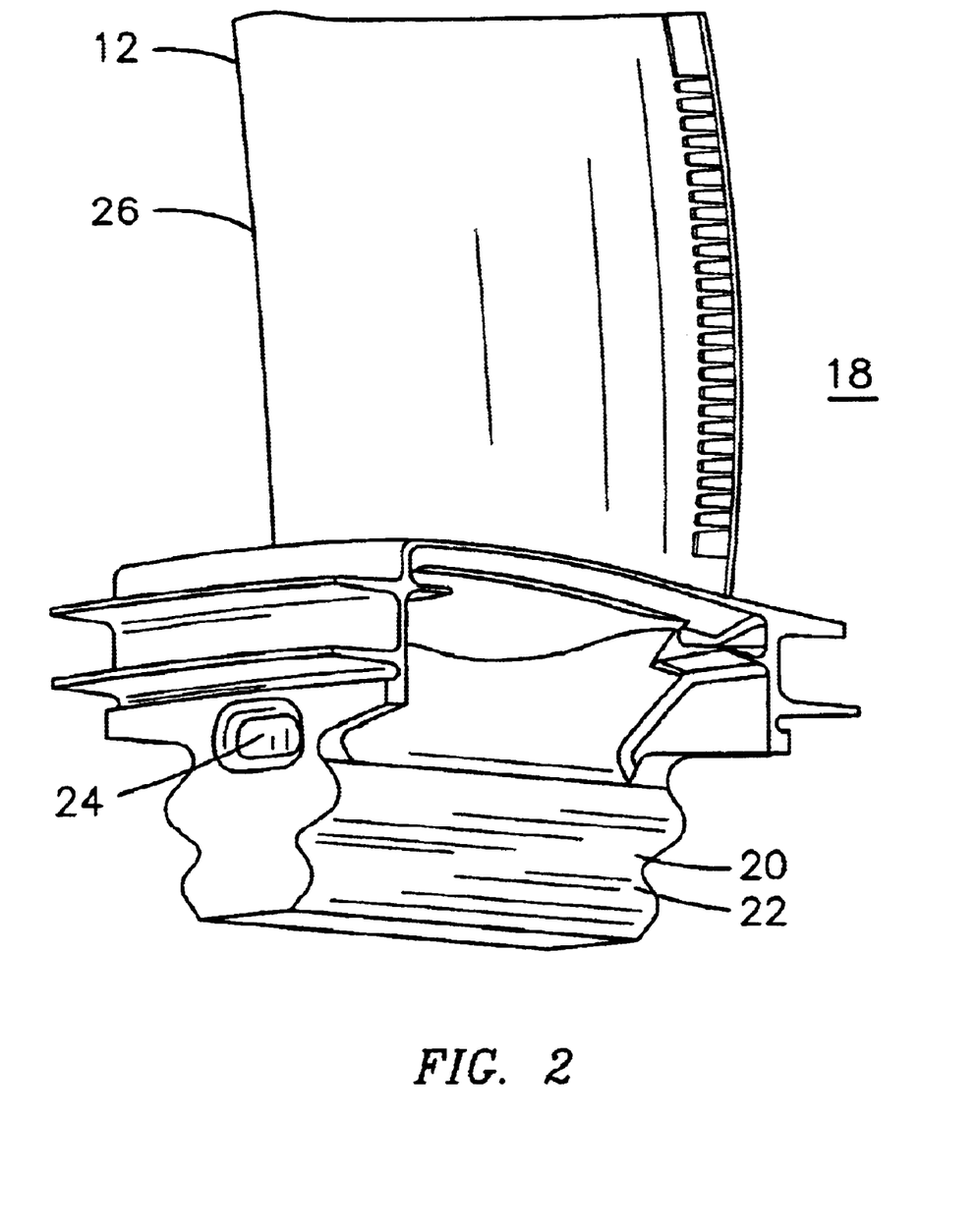
FIG. 2 illustrates a part.

FIG. 1 illustrates a fixture 10 having three significant contact surfaces. Only the contact surfaces of fixture 10 are illustrated in, FIG. 1, with the remaining portions of the fixture 10 taking a shape appropriate for interfacing with a machine tool (not shown). Fixture 10 includes an edge 12, a spherical structure 14, and a cylindrical structure 16. A part which may fit into fixture 10 is depicted in FIG. 2. The part 18 in this example is a turbine blade. Note that while the fixture 10 is a collection of relatively simple contact surfaces, the part is defined by surfaces which are not so easily modeled. These surfaces are known as free-form surfaces, and are usually contained in CAD models of the part.

Figure 3:
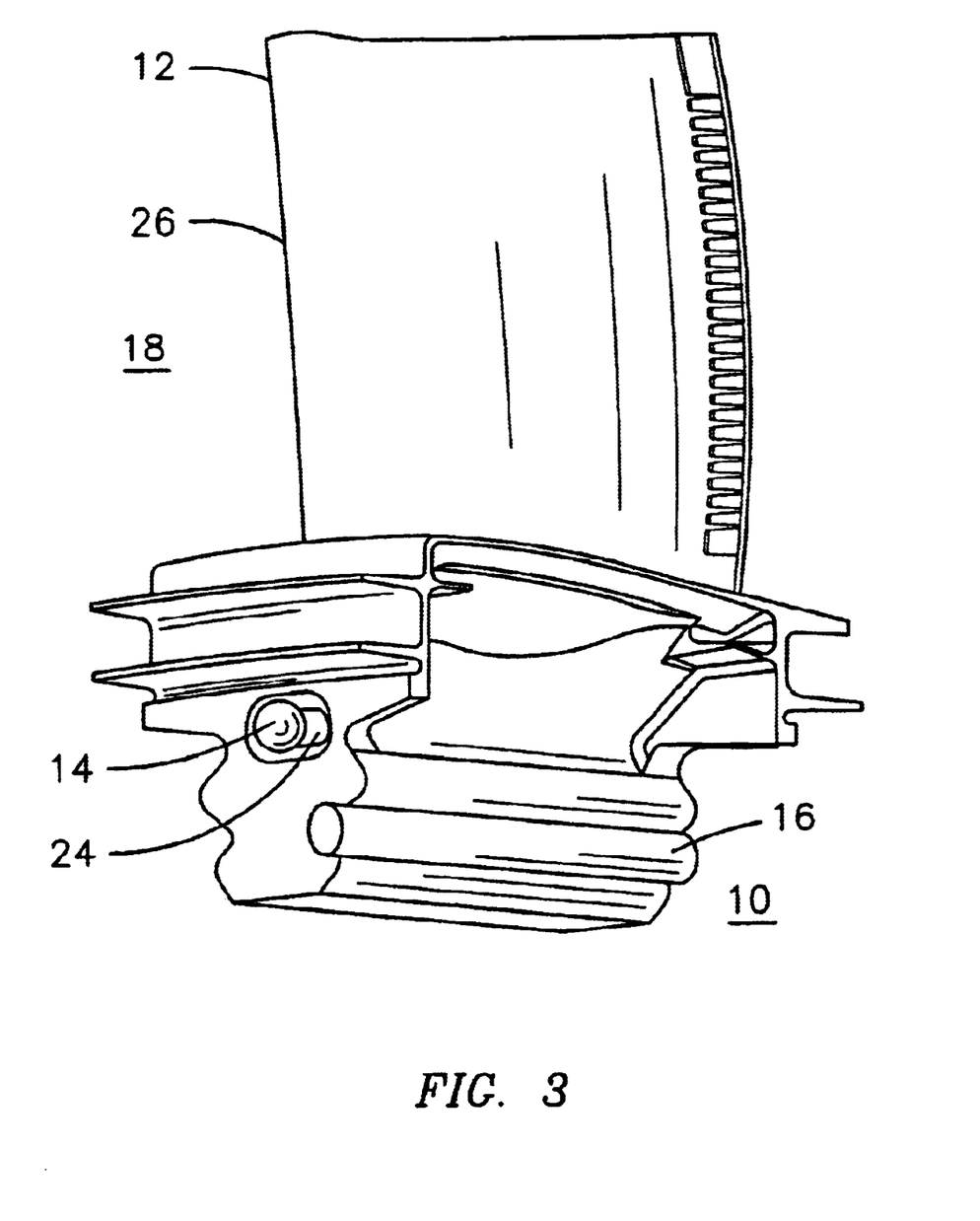
FIG. 3 illustrates the. part nested against the contact surfaces of the fixture.

When a part is placed in a fixture in such a way that the part cannot move without losing contact with at least one contact surface of the fixture, the part is said to be nested in the fixture. FIG. 3 illustrates part 18 nested in fixture 10. Ideally, the, nested position is a unique and unambiguous position of the part in the fixture, thus ensuring the part's correct orientation with respect to a subsequent machine, operation. In this example, pin 16 of fixture 10 is in contact with flat surfaces 20 22 as may be seen on FIG. 2. Similarly, ball 14 is in point contact with flat surface 24, and edge 12 is in either point or line contact with surface 26. These contacts restrain the movement of part 18 in all six degrees of freedom with respect to any coordinate system. The method disclosed herein provides for the nesting of a CAD representation of the part 18 into a CAD representation of the fixture 10. In this manner, the CAD representation of the part 18 may then be located in a machine tool's coordinate system exactly where it will be located during a manufacturing operation. It is then possible to. construct tool paths that correspond to the nested CAD representation of the part 18. By recording the transformation matrix used to nest the part representation into the fixture representation, it is possible to then apply the transformation matrix to the coordinates of any geometry associated with the CAD representation of the part to determine the alignment of that geometry as it lies nested in the fixture 10. This transformation matrix may also be applied to any tool path associated with the CAD representation of the part 18, and by doing so, causing those tool paths to align with the part 18 as it lies nested in the fixture 10. This approach is illustrated in FIG. 4.

Figure 4:
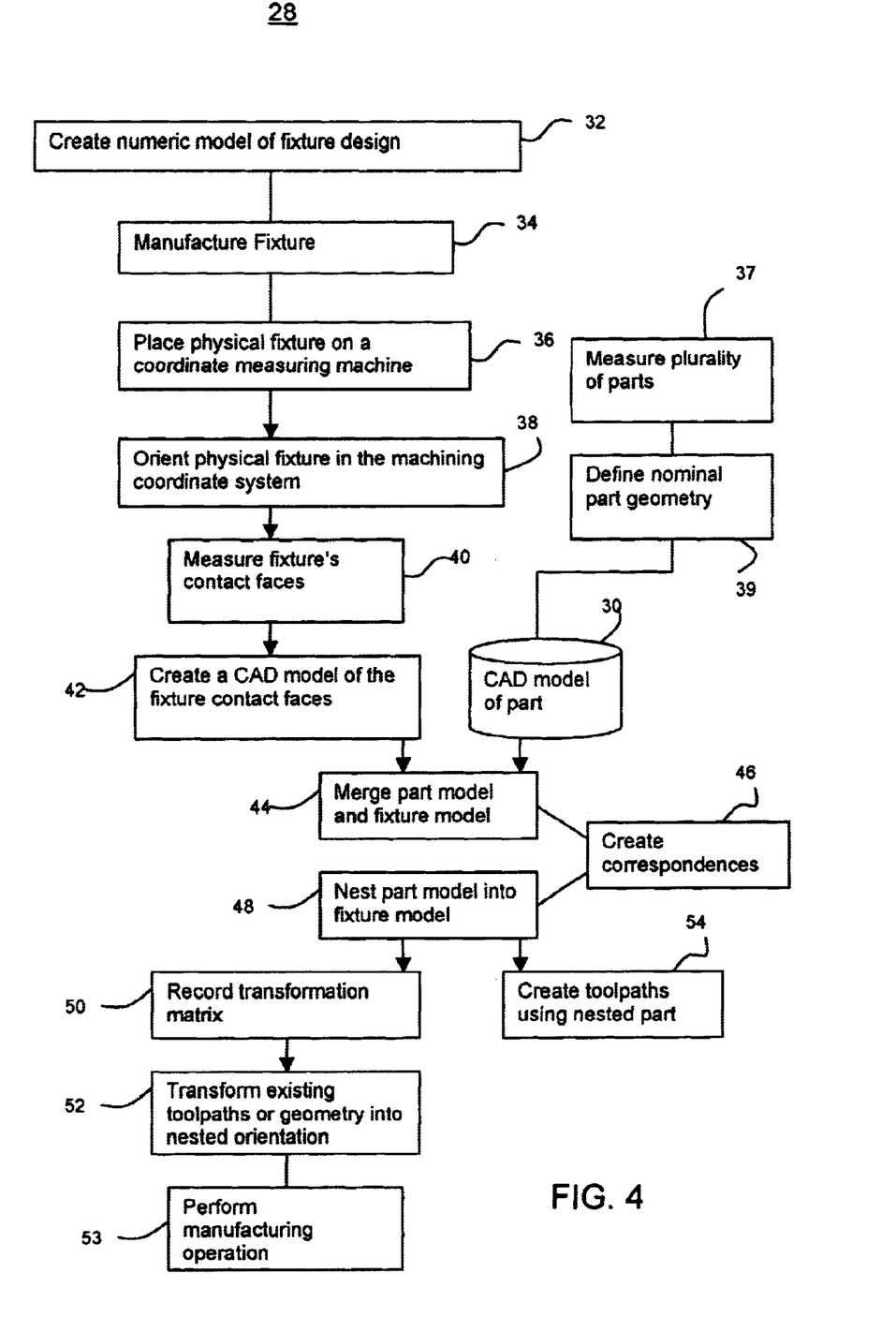
FIG. 4 illustrates the steps of a process for using a non-precision fixture to manufacture a precision part.

A first step 30 in the method 28 of FIG. 4 is to create a numeric model representing the part. The numeric model may be, for example, a CAD model of a part 18 in the format of any known CAD design tool. A numeric model of a fixture design may be created at step 32 using a similar CAD tool. The fixture 10 may have a plurality of contact faces 12,14,16 for supporting the part 18 in a design position relative to a machine tool coordinate system. The fixture 10 may then be manufactured at step 34 utilizing standard manufacturing tolerances, such as may be specified for the manufacturing of the part 18. The fixture 10 may then be placed on a coordinate measuring machine at step 36 to establish a CMM coordinate system around the Fixture 10 at step 38 to mirror the machine tool coordinates as they will exist when the fixture 10 is mounted on the NC machine tool. The size and location of the contact surfaces 12,14,16 of the fixture 10 are then measured at step 40.

A numeric model may then be created at step 42 to represent the contact surfaces 12,14,16 of the fixture 10 based upon the measurements taken at step 40. Note that mode is of the simple conic and flat-faced primitives can be constructed directly from the offsets of the CMM ball center data. The construction of a numeric model at step 42 may be done automatically using a library of commands such as those available with most commercial CAD systems. It is then possible at step 44 to merge the part model from step 30 and the fixture model from step 42 into the same CAD numeric model. Within this new CAD model, the modeled fixture 10 is oriented and located as it will be positioned in the machine tool, and the part model remains in its as-designed location and orientation. A set of correspondences may then be created at step 46 between the models of the fixture contact surfaces 12,14,16 and the models of the part surfaces 20, 22, 24, 26 which will be in contact when the part 18 is firmly nested in the fixture 10. It is then possible at step 48 to nest the part representation into the fixture representation. The nesting process is described more fully below, but generally it simulates the actual nesting of a real part into a real fixture. As part of the nesting step 48, a transformation matrix is used to move the part representation from its initial position to its nested position. The transformation. matrix may be recorded at step 50 and used at step 52 to transform an existing tool path or geometry into a nested orientation. Alternatively, tool paths may be created at step 54 for the nested part 18 directly from the nested part model. These tool paths will align the NC machine to the part as the part will be actually positioned on the tool. In this manner, precise positioning of the machine tool path is achieved without the need for a precise fixture.

Figure 5:
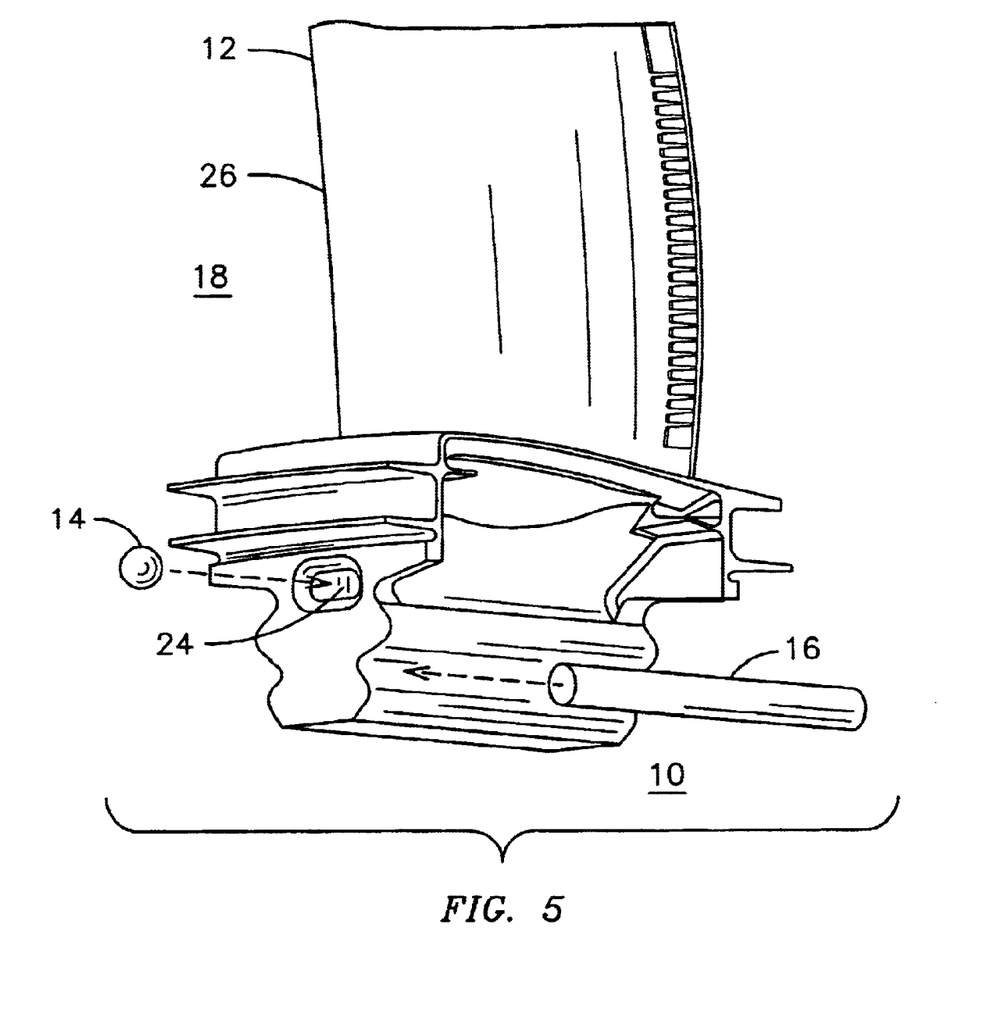
FIG. 5 illustrates a part and a fixture modeled in the same CAD model prior to being nested.
Figure 6:
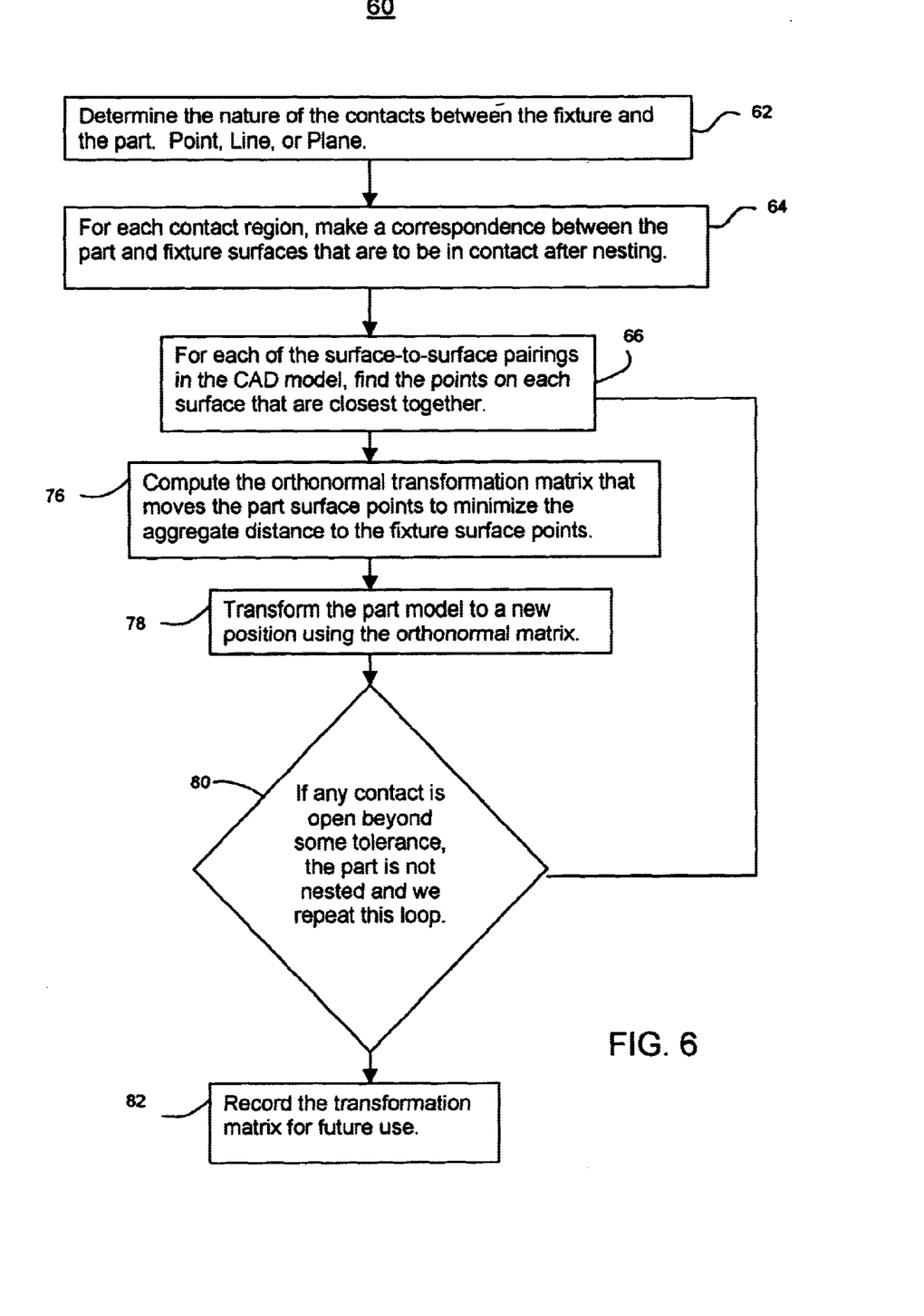
FIG. 6 illustrates the steps of a process for nesting.
Figure 7:
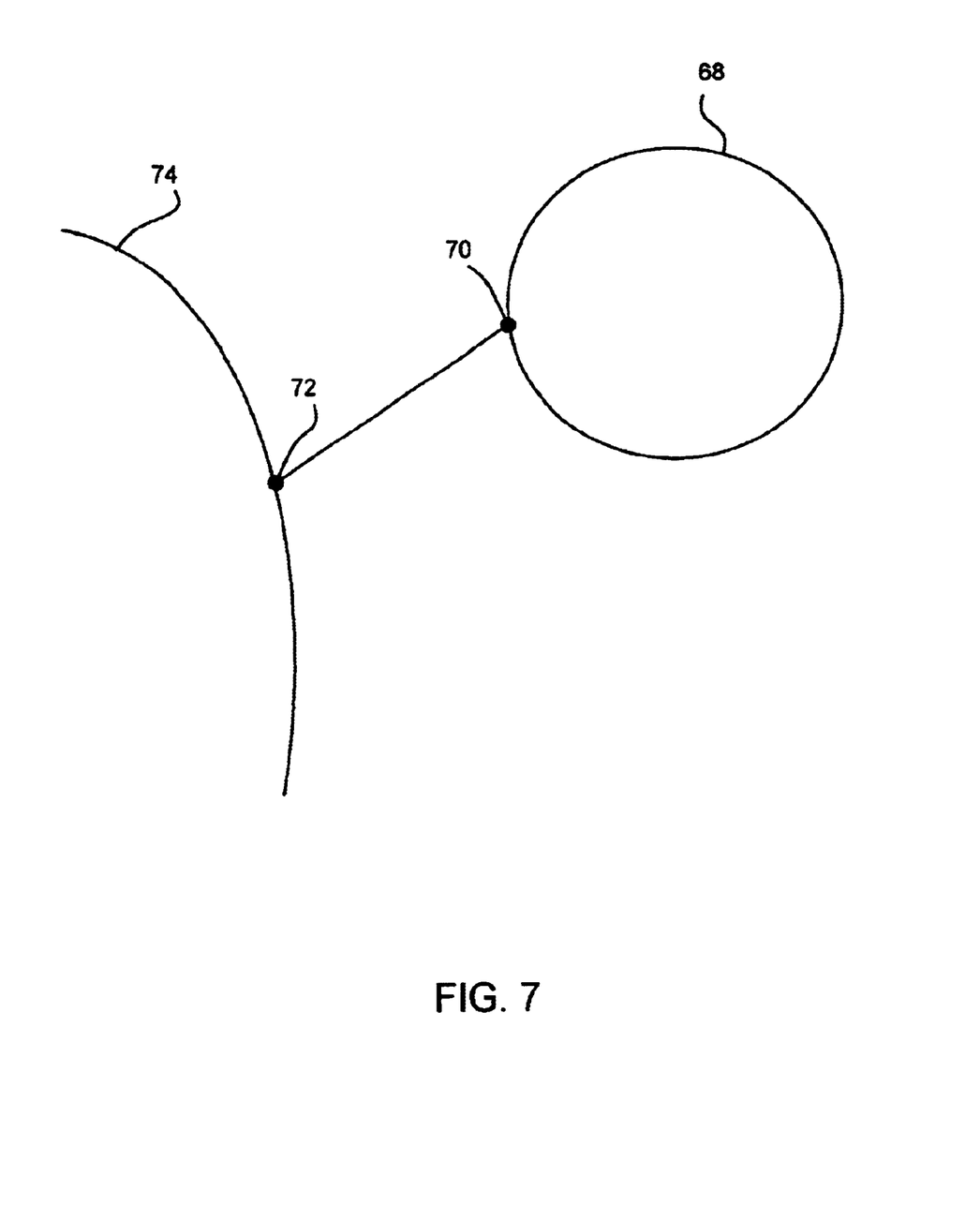
FIG. 7 illustrates the point pair on a part surface and the corresponding fixture surface.

FIG. 5 illustrates the model of the part 18 prior to its being nested with the model of the fixture 10. In FIG. 5 there is no interference or overlap between the surfaces of the part 18 and the fixture 10 in their initial positions. One method of nesting the part representation into the fixture representation is illustrated in FIG. 6. The nature of the contacts between the fixture 10 and the part 18 are determined at step 62 of FIG. 6; i.e. a point, line, or plane contact. For each contact region, a correspondence is established at step 64 between the part and fixture surfaces that are to be in contact after nesting. For each of the surface-to-surface pairings in the CAD model, the points on each surface that are closest together are identified in step 66. Such a point pair is illustrated in FIG. 7 where a fixture surface 68 has a point 70 which corresponds to a point 72 on a part surface 74. Such a point pairing is computed for every expected contact between the fixture 10 and the part 18. For this set of point pairs, an orthonormal transformation matrix is computed at step 76 of FIG. 6 to move the part surface points in such a manner as to minimize the aggregate distance to the fixture surface points. The part model is then transformed by using the orthonormnal transformation matrix to be in a new position at step 78. If the distance between any corresponding point pair remains beyond a predetermined value, as determined at step 80, the part is deemed to be not nested and steps 66,76,78 are repeated. If the distance between every point pairing is below the predetermined value at step 80, the transformation matrix is recorded at step 82 for further use as described above. This process simulates the actual nesting of the real part into the real fixture, and the transformation matrix represents the movement of a coordinate system of the part during the step of nesting.

Figure 8:
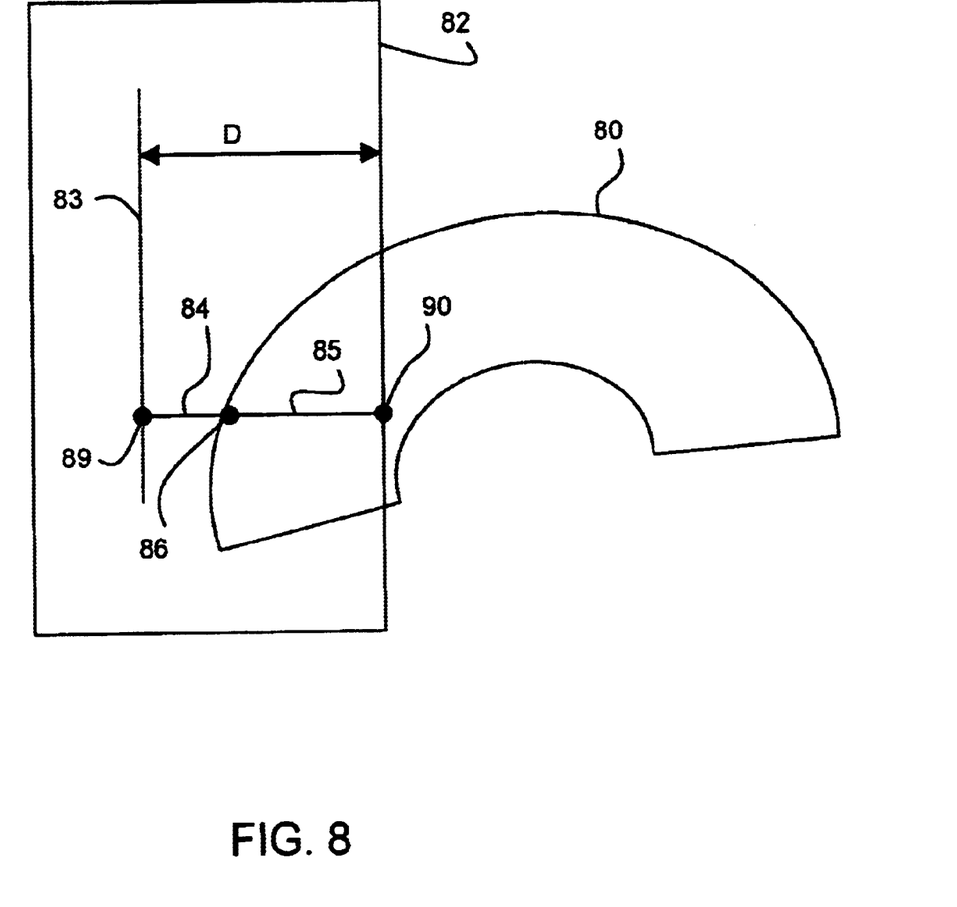
FIG. 8 illustrates the inset distance method for nesting a part model into an overlapping fixture model.

The step 66 of finding the points on each surface that are closest together involves determining the minimum normal distance between the respective paired surfaces of the part and fixture. The minimum normal distance between two surfaces is defined as the minimum distance by which the surface of the part model would need to be translated to form an allowable surface-to-surface intersection with the surface of the fixture. The allowable intersections are tangential surface-to-surface contacts between the part and the fixture only, i.e. line or point contact. In cases where the part model surface and the fixture model surface are not in contact, such as is illustrated in FIG. 7, it is possible to directly compute the minimum distance and vector between the surfaces, as shown by line 70–72 in FIG. 7. This method is referred to herein as the minimum distance method, and it is a capability available in existing computer modeling tools. Line segment 70–72. is called the minimum normal, distance segment, and it has a length equivalent to the minimum normal distance between the surfaces. The endpoints 70, 72 of the minimum normal distance segment are referred to as the minimum distance points. Due to the limitations of existing CAD systems, the minimum distance method will not, however, provided a true minimum normal distance when the part model and the fixture model overlap, as shown in FIG. 8. For the situation of FIG. 8, the computer modeling tool will define the distance between the part surface 80 and the fixture surface 82 as zero, and no vector information will be provided. In order to nest the part and the fixture, both the distance and the vector between the closest points on the part and the fixture must be known. Therefore, a more robust method must be used in cases where the part and fixture surfaces overlap.

A method is described herein for nesting a computer model of a part with a computer model of a fixture that is operable even if the two surfaces overlap in their original position. This method is referred to herein as the inset distance method. The term "inset" is known in the art of computer modeling as meaning the creation of a locus of points drawn normal to and equidistant to a surface to create a new inset surface removed from the original surface. For example, if the fixture is modeled as a cylinder, the inset fixture would be modeled as a second cylinder having the same centerline as the original cylinder but with a smaller diameter. The centers of gravity of the original model and the inset model are the same. The maximum inset that can be applied to a cylindrical fixture would be to model the fixture as a line. Similarly, a fixture shaped as a sphere may be inset by creating a model of smaller sphere, or at a maximum level of inset, as a point.

This method is described with reference to FIG. 8, where a part model includes a part surface 80 and a fixture model includes a corresponding fixture surface 82. The inset distance method begins by insetting the fixture model surface 82 by an inset distance D that is sufficient to eliminate any interference between the inset fixture model surface 83 and the part model surface 80. The exact value of D is not critical so long as the no-overlap criteria is satisfied. Once the fixture and part models are thus separated within the computer model tool, the minimum normal distance segment 84 can be identified between the inset fixture model surface 83 and the part model surface 80. Because there is no overlap or interference between the inset fixture surface 83 and the part surface 80, existing functionality within available CAD tools is operable to measure this distance and to define its orientation. The minimum normal distance segment 84 between the part and the inset fixture has as its endpoints the minimum distance point 86 on the part surface 80 and the minimum distance point 89 on the inset fixture surface 83.

The next step in the inset distance method is to construct a vector extending a distance D beginning at the inset fixture minimum distance point 89 and extending normal to the inset fixture model surface 83 in the direction of the minimum normal distance segment 84 The endpoint of this vector will lie on the original fixture model surface 82 and it locates a fixture contact point 90 on the fixture model surface 82. So long as fixture contact point 90 does not lie at a corner of the fixture, the minimum distance point on the part surface 80 corresponding to the fixture contact point 90 will lie along the vector, and will be displaced from point 89 by the distance D minus the length of minimum normal distance segment 84. This point constitutes a part contact point 86. Thus, both the length and orientation of the minimum normal distance segment 85 between the part surface 80 and the original fixture surface 82 are defined. The part contact point 86 of this minimum normal distance segment is recorded as $(X_1,Y_1,Z_1)$ and the corresponding fixture contact point is recorded as $(x_1,y_1,z_1)$.

The above process is repeated for each of the degrees of freedom of movement between the part and the fixture. For three dimensional parts/fixtures, there will be six corresponding point pairs as shown below:

| Part Model | Fixture Model |
|---|---|
| $X_1, Y_1, Z_1$ | $x_1, y_1, z_1$ |
| $X_2, Y_2, Z_2$ | $x_2, y_2, z_2$ |
| $X_3, Y_3, Z_3$ | $x_3, y_3, z_3$ |
| $X_4, Y_4, Z_4$ | $x_4, y_4, z_4$ |
| $X_5, Y_5, Z_5$ | $x_5, y_5, z_5$ |
| $X_6, Y_6, Z_6$ | $x_6, y_6, z_6$ |

It is then possible to compute a orthonormal transformation matrix $$\begin{bmatrix} a & b & c & d \\ e & f & g & h \\ i & j & k & l \\ 0 & 0 & 0 & 1 \end{bmatrix}$$

such that if the transformed part model points $(X'_1,Y'_1,Z'_1)$ are defined to be $$\begin{bmatrix} X'_i \\ Y'_i \\ Z'_i \\ 1 \end{bmatrix} = [X_i \ Y_i \ Z_i \ 1] * \begin{bmatrix} a & b & c & d \\ e & f & g & h \\ i & j & k & l \\ 0 & 0 & 0 & 1 \end{bmatrix}$$

that the aggregate distance between the newly transformed model points and the fixture points $$\sum_{i=0}^{6} ((X'_i - x_i)^2 + (Y'_i - y_i)^2 + (Z'_i - z_i)^2)$$

is minimized. Note that the aggregate distance is likely not going to be equal to zero, since as the part is translated along one degree of freedom, the matching points of minimum normal distance along the other degrees of freedom will change, thus leaving a finite distance between the originally identified point pairs when the part is placed in the newly transformed position. The above steps may then be repeated to define and to record six new matching point pairs, for which a second orthonormal transformation matrix may be calculated for minimizing the aggregate distance therebetween.

Any number of fitting criteria may then be checked to see if a desired level of nesting has been achieved. If not, the process is repeated, a new transformation matrix is calculated, and the criteria is again checked. Examples of stopping criteria include: having an aggregate, average or maximum distance below a predetermined threshold; having the improvement in aggregate distance being less than a predetermined value; and exceeding a predetermined number of iterations. Once the part is adequately nested, the final transformation matrix, the product of the transformation matrices of all iterations, is recorded and used for related applications as described herein.

This method has been described as using a transformation matrix that transforms the part points toward the fixture points, but in practice, it is possible to also use the method disclosed herein to perform nesting by iteratively computing and applying a transformation that transforms the fixture points toward the part points.

Note, that a single fixture surface may be used to provide resistance to movement in two degrees of freedom. For example, a cylindrical fixture surface may be designed to contact a planar part surface, or a planar fixture surface may be designed to contact an edge of the part. In both such examples, the contact between the part and the fixture surface is a line contact. For the purposes of the inset distance method described herein, such fixture surfaces are modeled as two spheres, one at the center of the original fixture surface and one at any other point along the interface surface. In this way, the two degrees of freedom provided by a single fixture surface may be separately processed in accordance with this invention.

Figure 9:
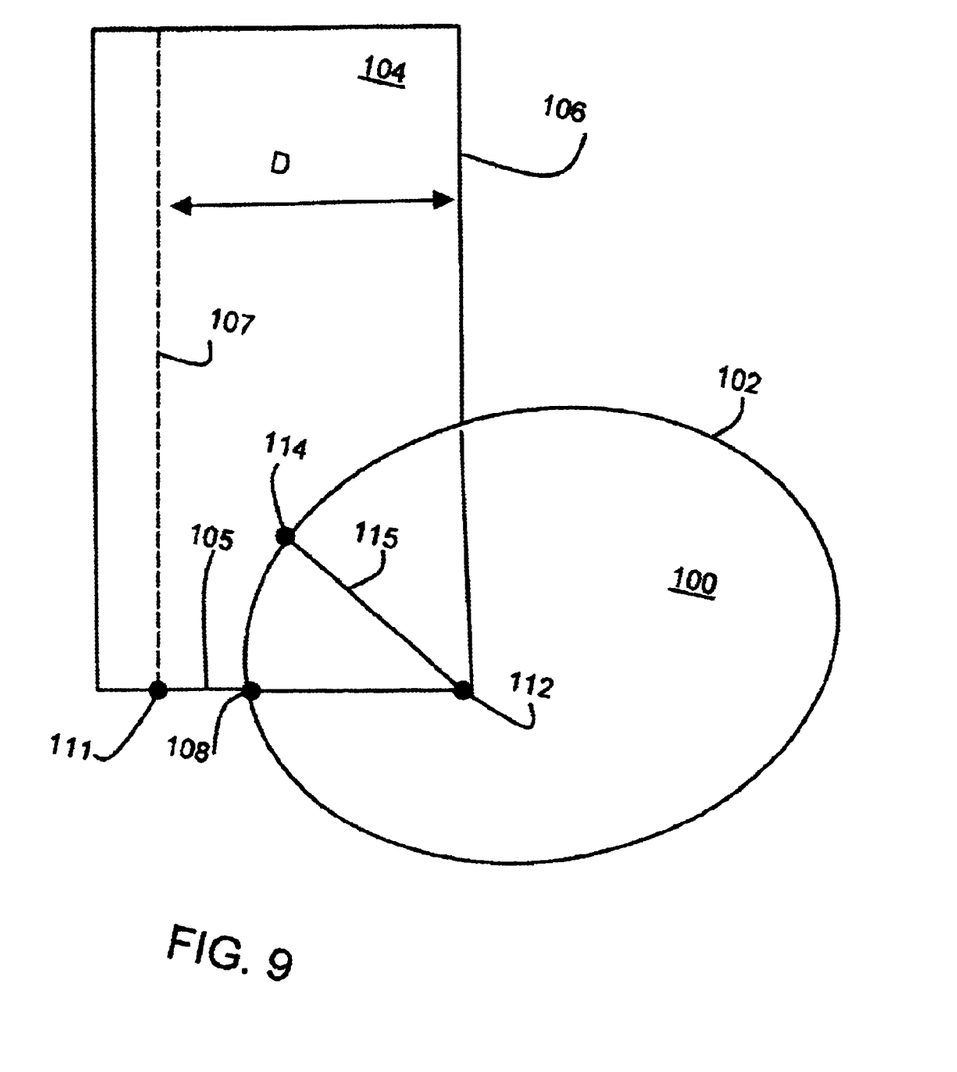
FIG. 9. illustrates the inset distance method for nesting a part model into an overlapping fixture model when the fixture contact point is located at a corner of the fixture.

FIG. 9 illustrates a computerized model of, a part 100 having a surface 102, and a computerized model of a fixture 104 having a surface 106 overlapping with the part surface 102. An inset fixture surface 107 is defined by insetting fixture 104 by an inset distance D. The minimum normal distance between the part surface 102 and the inset fixture surface 107 may then be identified as the minimum distance segment 105 having endpoints 108, 111 using standard CAD system subroutines. As described above, a vector may then be constructed in the direction of the minimum distance segment 105 beginning at endpoint 111 and extending a distance D to a fixture contact point 112 located on the original fixture surface 106. Note that point 112 is located at a corner of fixture 106, unlike point 90 in FIG. 8 which was located along a surface. Because point 112 is located at a corner of fixture 106, the part contact point corresponding to fixture contact point 112 may not lie along the vector drawn between points 111 and 112. Rather, as illustrated in FIG. 9, the minimum distance point corresponding to point 112 on the surface 102 of part 100, is part contact point 114. The location of the part contact point 114 that is closest to point 112 can be determined with standard CAD system functionality. Part contact point 114 is recorded as $(X_1,Y_1,Z_1)$ and fixture contact point 112 is recorded as point $(x_1,y_1,z_1)$. As above, similar minimum distance point pairs are recorded for the remaining degrees of freedom, and the appropriate transformation matrix is determined as described above. The inset distance method may be applied to modeling situations other than the nesting of a part model into a fixture model. It is useful in a variety of situations where the model of one structure overlaps the model of a second structure. Such situations occur in a variety of applications, such as architectural layout, equipment configuration, path planning, etc. When two model overlap, it would be useful to be able to determine the magnitude and direction of the overlap so that a preferred corrective action may be taken to eliminate the overlap. Known CAD system capabilities are not adequate to provide such distance and direction information when two bodies interfere, however, it is a relatively simple task to define the minimum normal distance between two surfaces or between a point and a surface. Therefore, the inset distance method described herein may be used to convert an overlap situation into a more easily handled separation situation. The example of simple fixture shapes, such as cylinders, spheres and planes are described herein because they provide predictable results when inset. Somewhat more complicated shapes may result when insetting a more complicated geometry, and in some cases a secondary operation must be applied to the inset structure. For example, when insetting the model of a desk, the opposing edges at a corner will create a reverse edge when inset, so a secondary operation such as the trimming of the edges may be required in order to facilitate the process. Nonetheless, it should be appreciated that the inset distance method may have application beyond the part/fixture embodiment.

One may appreciate that the final transformation matrix recorded at step 82 is the product of the several transformation matrices developed as step 76 is repeated. Accordingly, the movement of the part from a first position to a second position, such as from a design position in the machine tool to an as fixtured position in the machine tool, may be determined from the transformation matrix recorded in step 82. The movement to the nested position may then before be determined as a function of any desired coordinate system and from any starting point within such coordinate system. In essence, the transformation matrix recorded in step 82 defines the difference between the as-designed fixture and the as-manufactured fixture. By defining these differences in terms of a transformation matrix describing the effect of such differences on the position of a nested part, a transformation matrix is obtained that allows subsequent machine tool paths to be adjusted to reflect the deviations caused by an imprecisely manufactured fixture. Thus the method described herein substitutes the need for precisely manufacturing a fixture with the capability for precisely measuring an existing fixture. Current CMM technology makes such precise measurements a relatively easy tasks particularly for the above-described simple contact surface geometries, thereby decreasing the overall cost and increasing the overall accuracy of downstream manufacturing operations.

This process may further be used to account for the differences between an actual part, or a representative, part from a plurality of parts, and the as-designed part. As illustrated in FIG. 4, a plurality of parts may be measured at step 37 to define a nominal part geometry at step 39. The nominal part geometry may then be used to create the numeric model of the part at step 30. From this point forward, the process of FIG. 4 proceeds as described above. By using the dimensions of the nominal part, differences between various batches of parts may be accounted for, thereby improving the accuracy of downstream processes without the need, for a new precision fixture or a readjustment of an original fixture.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims

We claim:

1. A method of nesting a computer model of a part into a computer model of a fixture, the method comprising the steps of:

a) generating a model of a part in a computer tool, the part having a part model surface;

b) generating a model of a fixture in the computer tool, the fixture model having a fixture model surface;

c) generating a model of an inset fixture in the computer tool, the inset fixture having an inset fixture model surface that is inset from the fixture model surface by a distance D sufficient to eliminate any interference between the inset fixture model surface and the part model surface;

d) identifying a first minimum normal distance segment between the inset fixture model surface and the part model surface, the first minimum normal distance segment having as endpoints a part surface minimum distance point and an inset fixture surface minimum distance point;

e) constructing a vector extending a distance D in the direction of the first minimum normal distance segment beginning at the inset fixture surface minimum distance point and extending to a fixture contact point on the fixture model surface;

f) identifying a part contact point on the part model surface corresponding to the fixture contact point, the part contact point being a minimum normal distance from the fixture contact point;

g) recording the part contact point as $(X_1, Y_1, Z_1)$ and the fixture contact point as $x_1, y_1, z_1$);

h) transforming points of the part model to corresponding points of a transformed part model by applying a transformation matrix that minimizes the distance between the fixture contact point and a transformed part contact point;

i) recording the transformation matrix.

2. The method of claim 1, further comprising the steps of:

j) repeating steps c–g for each of the six degrees of freedom of movement between the part model and the fixture model; and k) wherein the step of transforming points of the part model comprises applying an orthonormal transformation matrix in the form of:

$$\begin{bmatrix} a & b & c & d \\ e & f & g & h \\ i & j & k & l \\ 0 & 0 & 0 & 1 \end{bmatrix}$$

such that if the transformed part model points $(X'_i, Y'_i, Z'_i)$ are defined to be $$\begin{bmatrix} X'_i \\ Y'_i \\ Z'_i \\ 1 \end{bmatrix} = [X_i \; Y_i \; Z_i \; 1] * \begin{bmatrix} a & b & c & d \\ e & f & g & h \\ i & j & k & l \\ 0 & 0 & 0 & 1 \end{bmatrix}$$

that the aggregate distance between the fixture contact points and the transformed part contact points $$\sum_{i=0}^{6} ((X'_i - x_i)^2 + (Y'_i - y_i)^2 + (Z'_i - z_i)^2)$$

is minimized.

3. The method of claim 2, further comprising:

repeating steps c–k until the aggregate distance is below a predetermined value; and recording a cumulative transformation matrix as the product of the transformation matrices recorded in each of the iterations of step i.

4. The method of claim 3, further comprising using the cumulative transformation matrix to transform a tool path modeled in a computer tool.

5. The method of claim 2, further comprising:
repeating steps c–k until the decrease in aggregate distance between iterations is less than a predetermined value.

6. A method of nesting a computer model of a part and a computer model of a fixture, the method comprising the steps of:

a) creating a model of a part in a computer tool;

b) creating a model of a fixture in the computer tool;

c) insetting the model of the fixture by a distance D sufficient to avoid interference between the part and the inset fixture for a first degree of freedom of movement between the part and the fixture;

d) identifying a minimum normal distance segment between the part and the inset fixture, the minimum normal distance segment having as endpoints an inset fixture minimum distance point and a part minimum distance point $(X_1,Y_1,Z_1)$;

e) constructing a vector having a length D and an origin at the inset fixture minimum distance point and extending in the direction of the minimum normal distance segment to a fixture minimum distance point $(x_1,y_1,z_1)$ on the fixture surface;

f) identifying a part minimum distance point $(X_i,Y_i,Z_i)$ and a fixture minimum distance point $(x_i,y_i,z_i)$ for each of the six degrees of freedom of movement between the part and the fixture;

g) transforming the model of the part by applying a transformation matrix to generate a transformed part model having points $(X'_i,Y'_i,Z'_i)$ such that the aggregate distance calculated as $$\sum_{i=0}^{6} ((X'_i - x_i)^2 + (Y'_i - y_i)^2 + (Z'_i - z_i)^2)$$

is minimized; and h) recording the transformation matrix.

7. The method of claim 6, further comprising repeating steps c–h until the aggregate distance is no more than a predetermined value.

8. The method of claim 6, further comprising repeating steps c–h until the aggregate distance is no more than a predetermined value or the number of repetitions is equal to a predetermined number.

9. The method of claim 6, further comprising using the transformation matrix to transform a tool path modeled in a computer tool.

10. A method of determining the magnitude and direction of overlap between two model in a computer tool, the method comprising:

generating a first object model in a computer tool;

generating a second object model in a computer tool, the second object model having a geometric overlap with the first object model;

insetting the first object model by a distance D sufficient to eliminate the overlap;

identifying a first minimum distance segment between the inset first object model and the second object model;

constructing a vector along the first minimum distance segment beginning at a minimum distance point on the surface of the inset first object model and extending a distance D to a first object model contact point;

identifying a second minimum distance segment between the first object model contact point and the second object model;

recording the magnitude and direction of the second minimum distance segment.

* * * * *

UNITED STATES PATENT AND TRADEMARK OFFICE
CERTIFICATE OF CORRECTION

PATENT NO.    : 6,661,930 B1
DATED         : December 9, 2003
INVENTOR(S)   : Michael Evans Graham et al.

It is certified that error appears in the above-identified patent and that said Letters Patent is hereby corrected as shown below:

Column 2,
Line 66, reads "The is a futher need to develop a method for nesting a" should read
-- There is a further need to develop a method for nesting a --

Column 3,
Line 3, reads "Accordingly, A method of nesting a computer model of a" should read
-- Accordingly, a method of nesting a computer model of a --
Line 41, reads "Fig. 3 illustrates the. pat nested against the contact" should read
-- FIG. 3 illustrates the part nested against the contact --

Column 4,
Line 3, reads "illustrated in, FIG. 1, with the remaining portions of the" should read
-- illustrated in Fig. 1, with the remaining portions of the --
Line 20, reads "correct orientation with respect to a subsequent machine," should read
-- correct orientation with respect to a subsequent machine --
Line 22, reads "with flat surfaces 20 22 as may be seen on Fig. 2. Similarly," should
read -- with flat surfaces 20 and 22 as may be seen on FIG.2. Similarly, --
Line 56, reads "CMM coordinte system around the Fixture 10 at step 38 to" should read
-- CMM coordinate system around the fixture 10 at step 38 to --
Line 64, reads "mode is of the simple conic and flat-faced primitives can be" should
read -- models of the simple conic and flat-faced primitives can be --

Column 5,
Line 47, reads "the orthonormnal transformation matrix to be in a new" should read
-- the orthonormal transformation matrix to be in a new --

Column 6,
Line 13, reads "not, however, provided a true minimum normal distance" should read
-- not, however, provide a true minimum normal distance --

Column 9,
Line 41, reads "differences between an actual part, or a representative.part" should read
-- differences between an actual part, or a representative part --

UNITED STATES PATENT AND TRADEMARK OFFICE
CERTIFICATE OF CORRECTION

PATENT NO. : 6,661,930 B1
DATED : December 9, 2003
INVENTOR(S) : Michael Evans Graham et al.

It is certified that error appears in the above-identified patent and that said Letters Patent is hereby corrected as shown below:

<u>Column 12,</u>
Line 2, reads "of overlap between two model in a computer tool, the" should read
-- of overlap between two models in a computer tool, the --

Signed and Sealed this

Fifth Day of April, 2005

JON W. DUDAS
*Director of the United States Patent and Trademark Office*